(12) United States Patent
Huang et al.

(10) Patent No.: US 10,850,719 B2
(45) Date of Patent: Dec. 1, 2020

(54) ANTI-LOCK BRAKE DEVICE

(71) Applicant: TEKTRO TECHNOLOGY CORPORATION, Changhua County (TW)

(72) Inventors: Po-Hsien Huang, Changhua County (TW); Tzu-Chang Wang, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 84 days.

(21) Appl. No.: 16/398,723

(22) Filed: Apr. 30, 2019

(65) Prior Publication Data

US 2019/0337501 A1    Nov. 7, 2019

(30) Foreign Application Priority Data

May 4, 2018    (TW) .............................. 107115304 A

(51) Int. Cl.
*B60T 11/34*    (2006.01)
*B60T 15/16*    (2006.01)
*B60T 8/36*    (2006.01)

(52) U.S. Cl.
CPC ............... *B60T 11/34* (2013.01); *B60T 15/16* (2013.01); *B60T 8/3615* (2013.01)

(58) Field of Classification Search
CPC ........ B60T 11/34; B60T 8/3615; B60T 15/16; B60T 8/1706; B60T 8/3225; B62K 23/06; B62L 3/02

USPC ........... 303/9.72, 9.64, 9.62, 137; 188/24.11, 188/24.15; 60/576, 579, 581
See application file for complete search history.

(56) References Cited

U.S. PATENT DOCUMENTS

| | | | | |
|---|---|---|---|---|
| 3,694,038 A | * | 9/1972 | Ingram | B60T 13/12 303/115.5 |
| 4,315,659 A | * | 2/1982 | Hayashi | B60T 8/3225 188/181 A |
| 4,421,359 A | * | 12/1983 | Hayashi | B60T 8/4004 188/344 |

FOREIGN PATENT DOCUMENTS

| | | | |
|---|---|---|---|
| GB | 2033516 A | * | 5/1980 |
| JP | 8-225071 A | * | 9/1996 |
| JP | 2014121959 A | * | 7/2014 |

\* cited by examiner

*Primary Examiner* — Pamela Rodriguez
(74) *Attorney, Agent, or Firm* — Locke Lord LLP; Tim Tingkang Xia, Esq.

(57) ABSTRACT

The disclosure provides an anti-lock brake device including an oil pressure tank, a first piston and a second piston. The oil pressure tank has an internal space, an oil inlet and an oil outlet that are connected to one another. The first piston is slidably located in the internal space, and has a first oil channel penetrating a contact portion of the first piston and connected to the oil inlet. The second piston is slidably located in the internal space and includes a push portion, and an outer diameter of the push portion is smaller than that of the contact portion. When the second piston is in a closed position, a chamber having a first unoccupied volume is formed in the internal space. When the second piston is moved from the closed position to a depressurized position, the first volume of the chamber is increased to a second volume.

12 Claims, 8 Drawing Sheets

ANTI-LOCK BRAKE DEVICE

CROSS-REFERENCE TO RELATED APPLICATIONS

This non-provisional application claims priority under 35 U.S.C. § 119(a) on Patent Application No(s). 107115304 filed in Taiwan, R.O.C. on May 4, 2018, the entire contents of which are hereby incorporated by reference.

TECHNICAL FIELD

The disclosure relates to an anti-lock brake device, more particularly an anti-lock brake device using two pistons that have different outer diameters to depressurize oil pressure.

BACKGROUND

In recent years, road bikes, mountain bikes and other types of bikes become more and more popular so that the manufacturers pay more attention on developing new and market-oriented products in order to provide costumers a better riding experience and a more stylish appearance of bicycle. However, in the safety aspect, the conventional bikes in the market still need to be improved.

Brake system is one of the most important factors to the bicycle safety. The caliper is the most commonly used means in the brake system. The caliper is disposed near a brake disk which is rotatable with a bicycle wheel, and it is able to clamp the brake disk to stop the rotation of the bicycle wheel as the rider squeeze the brake lever.

SUMMARY OF THE INVENTION

One embodiment provides an anti-lock brake device. The anti-lock brake device includes an oil pressure tank, a first piston and a second piston. The oil pressure tank has an internal space, an oil inlet and an oil outlet that are connected to one another. The first piston is slidably located in the internal space. The first piston has a first oil channel, and the first piston includes a contact portion. The first oil channel penetrates through the contact portion and is connected to the oil inlet. The second piston is slidably located in the internal space and movable among an initial position, a closed position and a depressurized position. The closed position is located between the initial position and the depressurized position. The second piston includes a push portion, and an outer diameter of the push portion is smaller than an outer diameter of the contact portion. When the second piston is in the initial position, the push portion and the contact portion are separated from each other, and the first oil channel is connected to the oil inlet via the internal space. When the second piston is in the closed position, the push portion is in contact with the contact portion and disconnects the first oil channel from the oil outlet so as to form a chamber having a first unoccupied volume in the internal space. When the second piston is moved from the closed position to the depressurized position, the push portion presses against and moves the contact portion, such that the first unoccupied volume of the chamber is increased to a second unoccupied volume due to the different outer diameters of the push portion and the contact portion.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
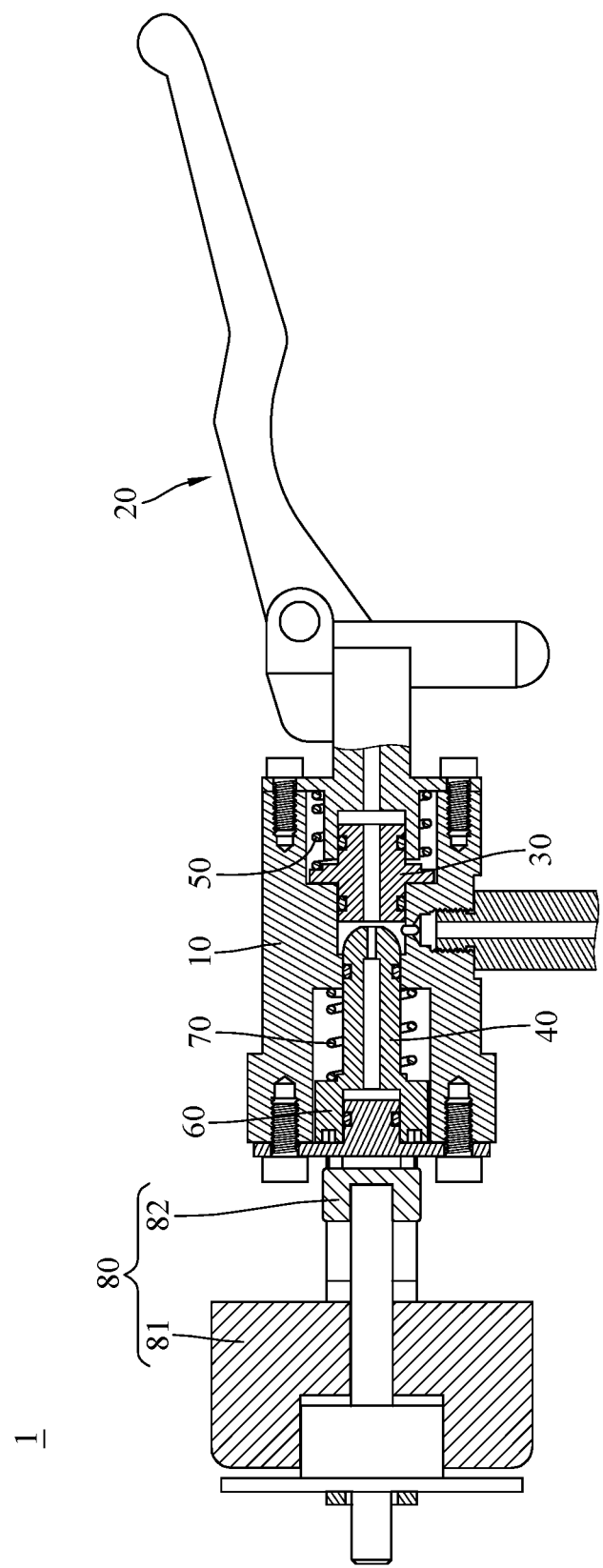
FIG. 1 is a partial cross-sectional view of an anti-lock brake device according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
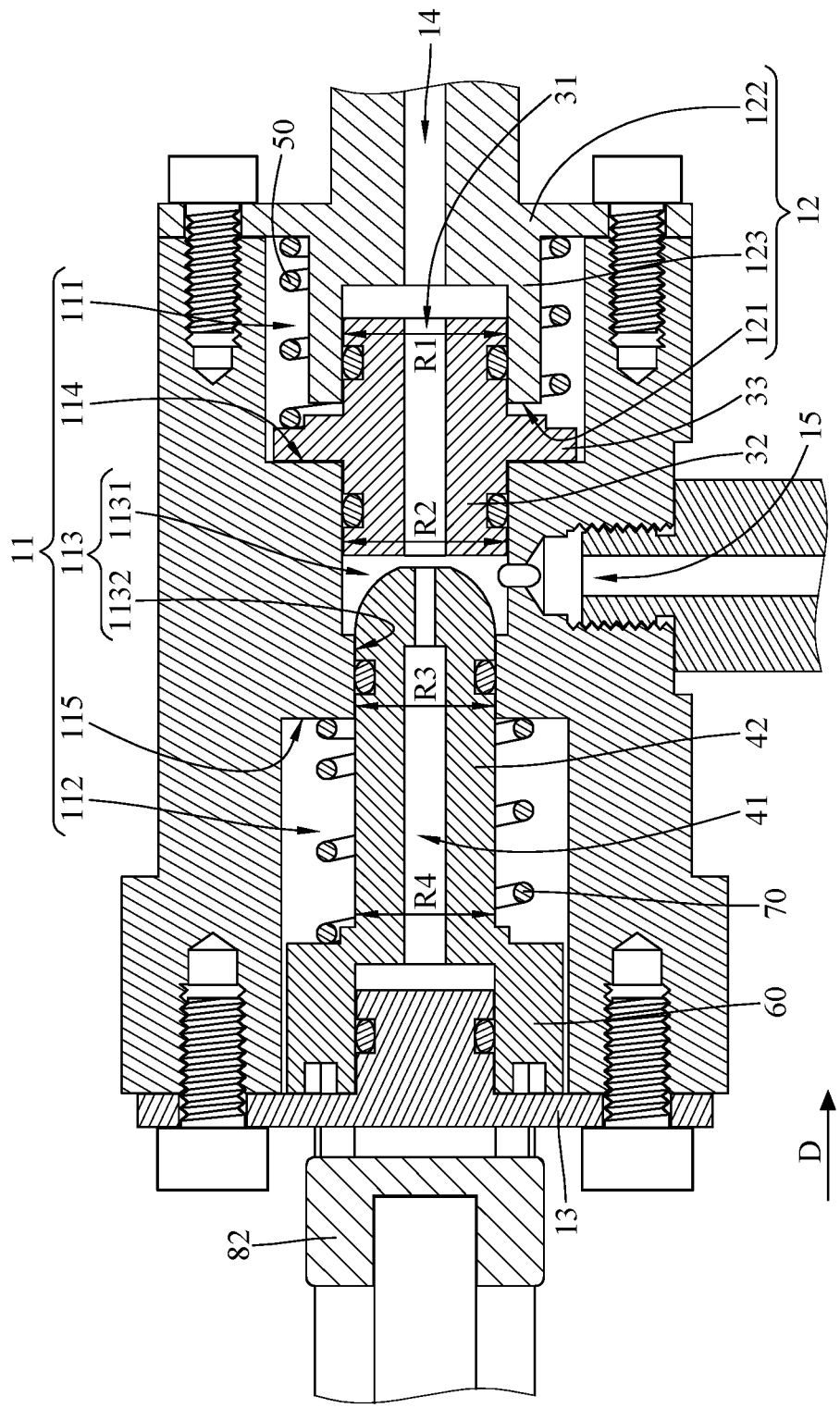
FIG. 2 is a partially enlarged view of the anti-lock brake device in FIG. 1.
Figure 3:
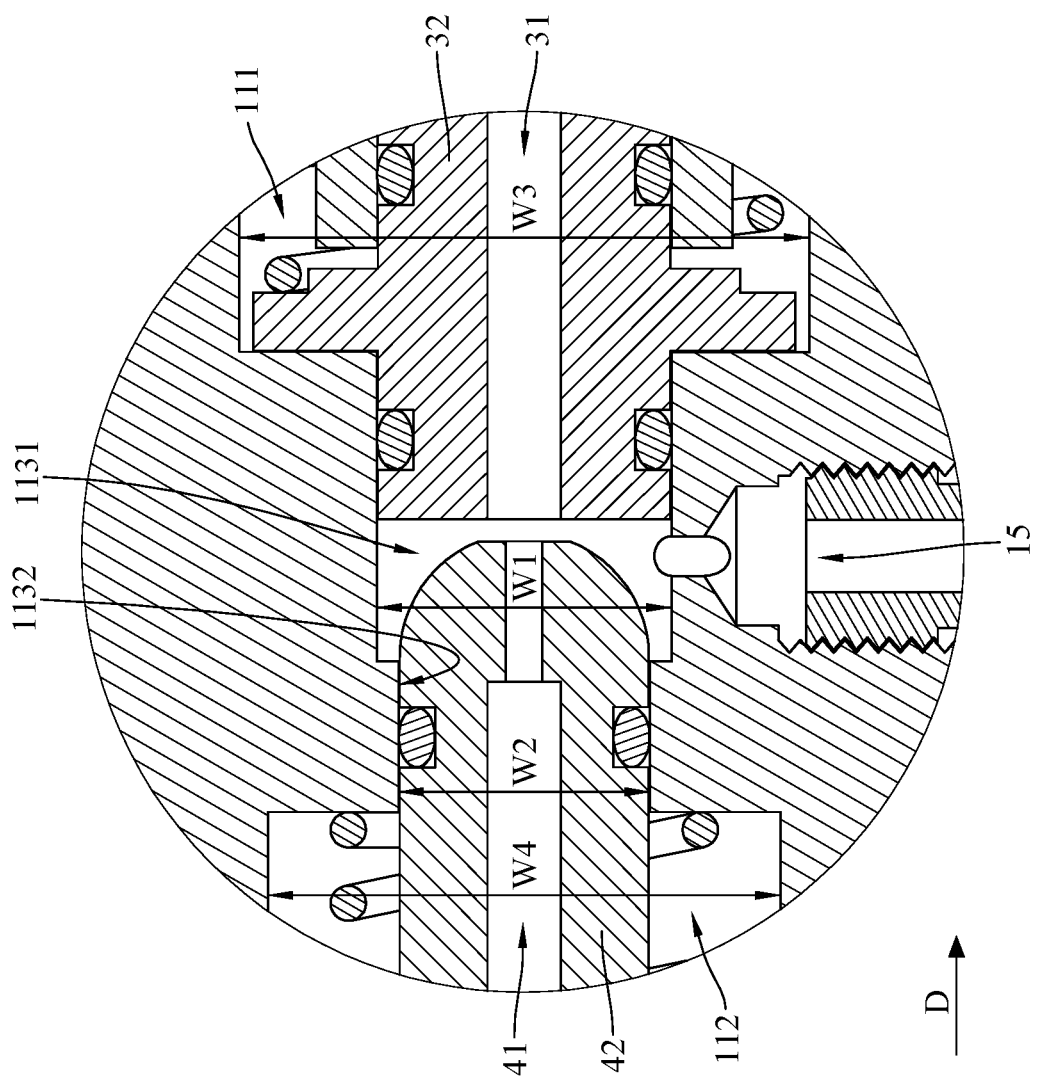
FIG. 3 is a partially enlarged view of the anti-lock brake device in FIG. 2.

Please refer to FIG. 1 to FIG. 3. FIG. 1 is a partial cross-sectional view of an anti-lock brake device according to a first embodiment of the disclosure. FIG. 2 is a partially enlarged view of the anti-lock brake device in FIG. 1. FIG. 3 is a partially enlarged view of the anti-lock brake device in FIG. 2.

This embodiment provides an anti-lock brake device 1. The anti-lock brake device 1 includes an oil pressure tank 10, a brake lever 20, a first piston 30, a second piston 40, a first elastic component 50, a movable component 60, a second elastic component 70 and a driving device 80.

The oil pressure tank 10 has an internal space 11, a first stop surface 114, an inner surface 115, a first cover 12, a second cover 13, an oil inlet 14 and an oil outlet 15. The internal space 11 has a first chamber 111, a second chamber 112 and a connect chamber 113. The connect chamber 113 includes a wide portion 1131 and a narrow portion 1132 connected to each other. The width W1 of the wide portion 1131 of the connect chamber 113 is larger than the width W2 of the narrow portion 1132. The first chamber 111 is connected to an end of the wide portion 1131 away from the narrow portion 1132, and the second chamber 112 is connected to an end of the narrow portion 1132 away from the wide portion 1131. The width W3 of the first chamber 111 is larger than the width W1 of the wide portion 1131, and the width W4 of the second chamber 112 is larger than the width W2 of the narrow portion 1132. The first stop surface 114 is located between the first chamber 111 and the wide portion 1131, and the inner surface 115 is located between the second chamber 112 and the narrow portion 1132. The first cover 12 covers a side of the first chamber 111 away from the connect chamber 113, and the first cover 12 has a second stop surface 121. In detail, the first cover 12 includes a plate part 122 and a protrusion part 123 connected to each other. The plate part 122 covers the first chamber 111, and the protrusion part 123 is located in the first chamber 111, and the second stop surface 121 is located at an end of the protrusion part 123 away from the plate part 122. The second cover 13 covers a side of the second chamber 112 away from the connect chamber 113. The oil inlet 14 penetrates through the first cover 12 and is connected to the first chamber 111, and the oil outlet 15 is located between the first cover 12 and the second cover 13 and is connected to the wide portion 1131 of the connect chamber 113.

In this embodiment, the brake lever 20 is, for example, an oil pressure bicycle brake lever. The brake lever 20 is directly connected to the oil inlet 14 of the oil pressure tank 10, but the present disclosure is not limited thereto; in some other embodiments, the brake lever may be connected to the oil inlet of the pressure tank via a tube. In addition, in this embodiment, the oil outlet 15 is, for example, connected to a caliper (not shown) of a bicycle via another tube.

The first piston 30 has a first oil channel 31, and the first piston 30 includes a contact portion 32 and a flange portion 33. The first oil channel 31 penetrates through the contact portion 32 and is connected to the oil inlet 14. The contact portion 32 of the first piston 30 is partially located in the first chamber 111, and another part of the contact portion 32 is located in the wide portion 1131 of the connect chamber 113. Two opposite ends of the contact portion 32 have the same outer diameters R1 and R2. The flange portion 33 protrudes from the contact portion 32 in a radial direction of the contact portion 32, and the flange portion 33 is located in the first chamber 111.

The second piston 40 has a second oil channel 41, and the second piston 40 includes a push portion 42. The second oil channel 41 penetrates through the push portion 42. In this embodiment, the push portion 42 of the second piston 40 extends from the wide portion 1131 to the second chamber 112. Two opposite ends of the push portion 42 respectively have the same outer diameters R3 and R4. In addition, the outer diameter R2 of the contact portion 32 of the first piston 30 is larger than the outer diameter R3 of the push portion 42 of the second piston 40.

The first elastic component 50 is located in the first chamber 111, and two opposite ends of the first elastic component 50 respectively press against the flange portion 33 and the plate part 122 of the first cover 12. The first elastic component 50 is configured to force the first piston 30 to move toward the second piston 40.

The movable component 60 is located in the second chamber 112 and is connected to the push portion 42 of the second piston 40. The second elastic component 70 is located in the second chamber 112 and is sleeved on the push portion 42 of the second piston 40. Two opposite ends of the second elastic component 70 respectively press against the inner surface 115 and the movable component 60. The second elastic component 70 is configured to force the second piston 40 to move away from the first piston 30.

The driving device 80, for example, includes a driving unit 81 and a push component 82. The push component 82 is disposed through the second cover 13 and is in contact with the movable component 60. The driving unit 81 can drive the push component 82 to push the movable component 60, for example, via an electromagnetic manner, such that the movable component 60 can move the second piston 40 from an initial position to a closed position, and then to a depressurized position. Note that the closed position is between the initial position and the depressurized position.

In this embodiment, the location of the movable component 60 is not restricted; in some other embodiments, the movable component may be partially located in the second chamber 112, and another part of the movable component may be located outside the oil pressure tank; that is, the movable component may be disposed though the second cover. In addition, in another embodiment, the push component may be spaced apart from the movable component when the push component does not yet push the movable component.

As shown in FIG. 2, when the second piston 40 is in the initial position, the flange portion 33 of the first piston 30 is in contact with the first stop surface 114, and the movable component 60 is in contact with the second cover 13. In addition, the push portion 42 of the second piston 40 are separated from the contact portion 32 of the first piston 30, and the first oil channel 31 and the second oil channel 41 both are connected to the oil outlet 15 via the wide portion 1131 of the connect chamber 113 of the internal space 11.

When the brake lever 20 is squeezed, the oil is transmitted into the first oil channel 31 of the first piston 30 from the oil inlet 14, and then flows toward the oil outlet 15 through the wide portion 1131 of the connect chamber 113. As a result, the oil comes out of the oil outlet 15 will force the caliper to clamp a bicycle brake disk to brake the bicycle.

In this embodiment, the first oil channel 31, that penetrates the contact portion 32 of the first piston 30, allows the oil to flow toward opposite ends of the contact portion 32, and the outer diameters R1 and R2 at the opposite ends of the contact portion 32 are the same so that forces resulted from the oil exerting on the opposite ends of the contact portion 32 are equal to each other. Therefore, the first piston 30 is in the static equilibrium state. Similarly, the second oil channel 41 connected to first oil channel 31, that penetrates the push portion 42 of the second piston 40, allows the oil to flow toward opposite ends of the second piston 40, and the outer diameters R3 and R4 at the opposite ends of the push portion 42 are the same, such that the second piston 40 is also in the static equilibrium state.

When a detecting device on the bicycle detects that the wheels are locked up caused by squeezing the brake lever 20 too hard, a controller of the bicycle will activate the driving unit 81 so as to drive the push component 82 to push the movable component 60 toward the first cover 12 along a direction D and thus moving the second piston 40 to the closed position from the initial position.

Figure 4:
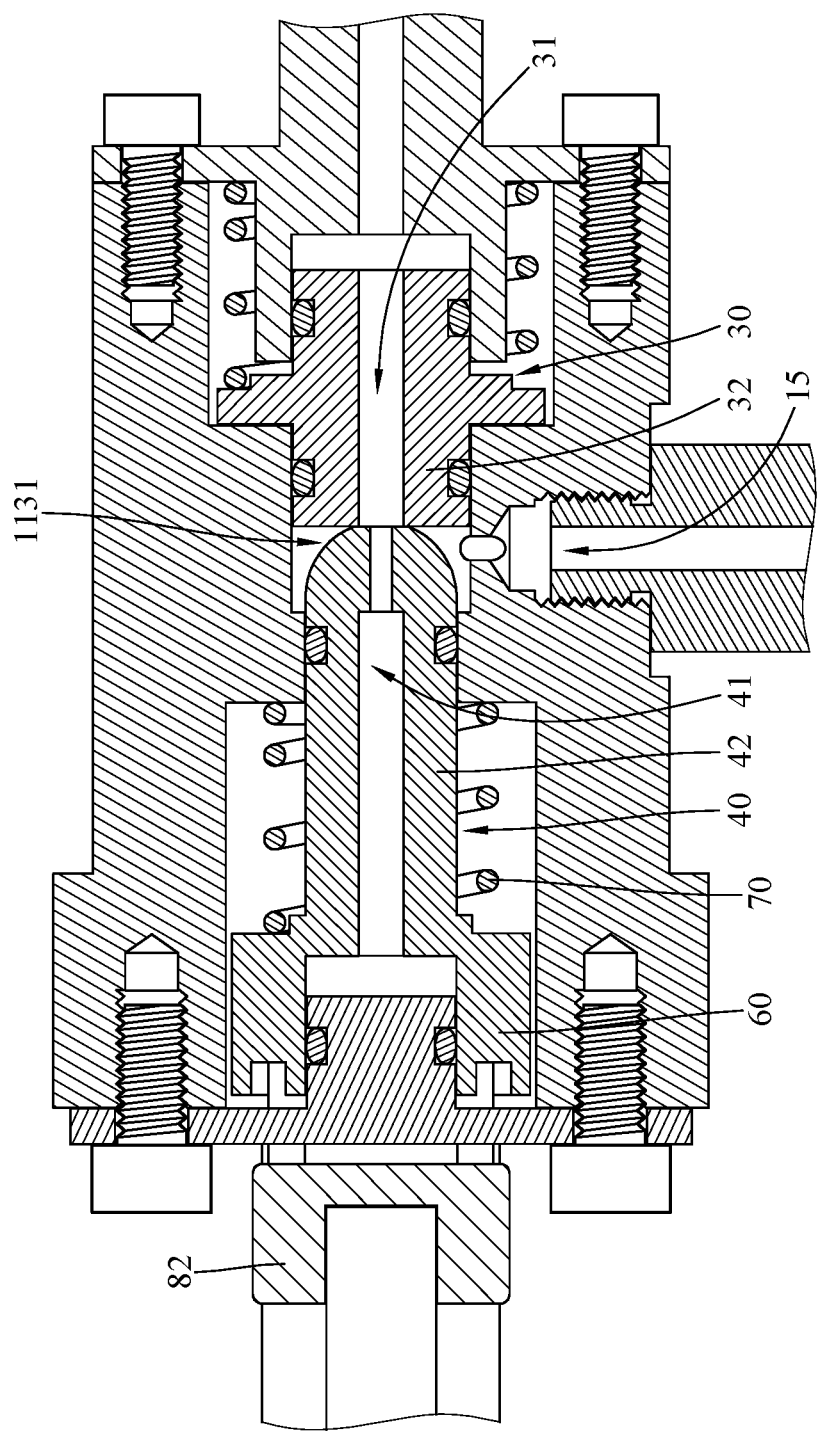
FIG. 4 is a partially enlarged view of the anti-lock brake device in FIG. 2 when the second piston is in a closed position.
Figure 5:
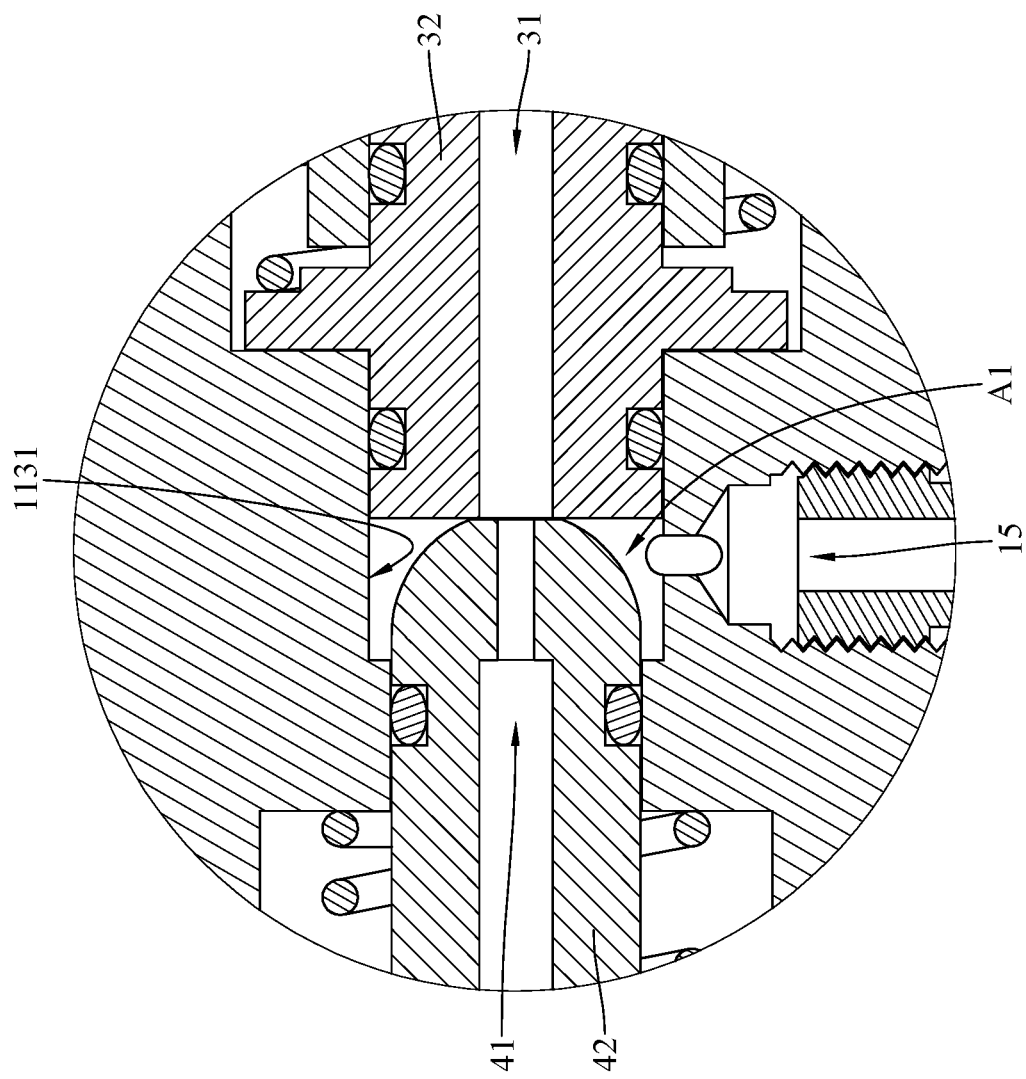
FIG. 5 is a partially enlarged view of the anti-lock brake device in FIG. 4.
Figure 6:
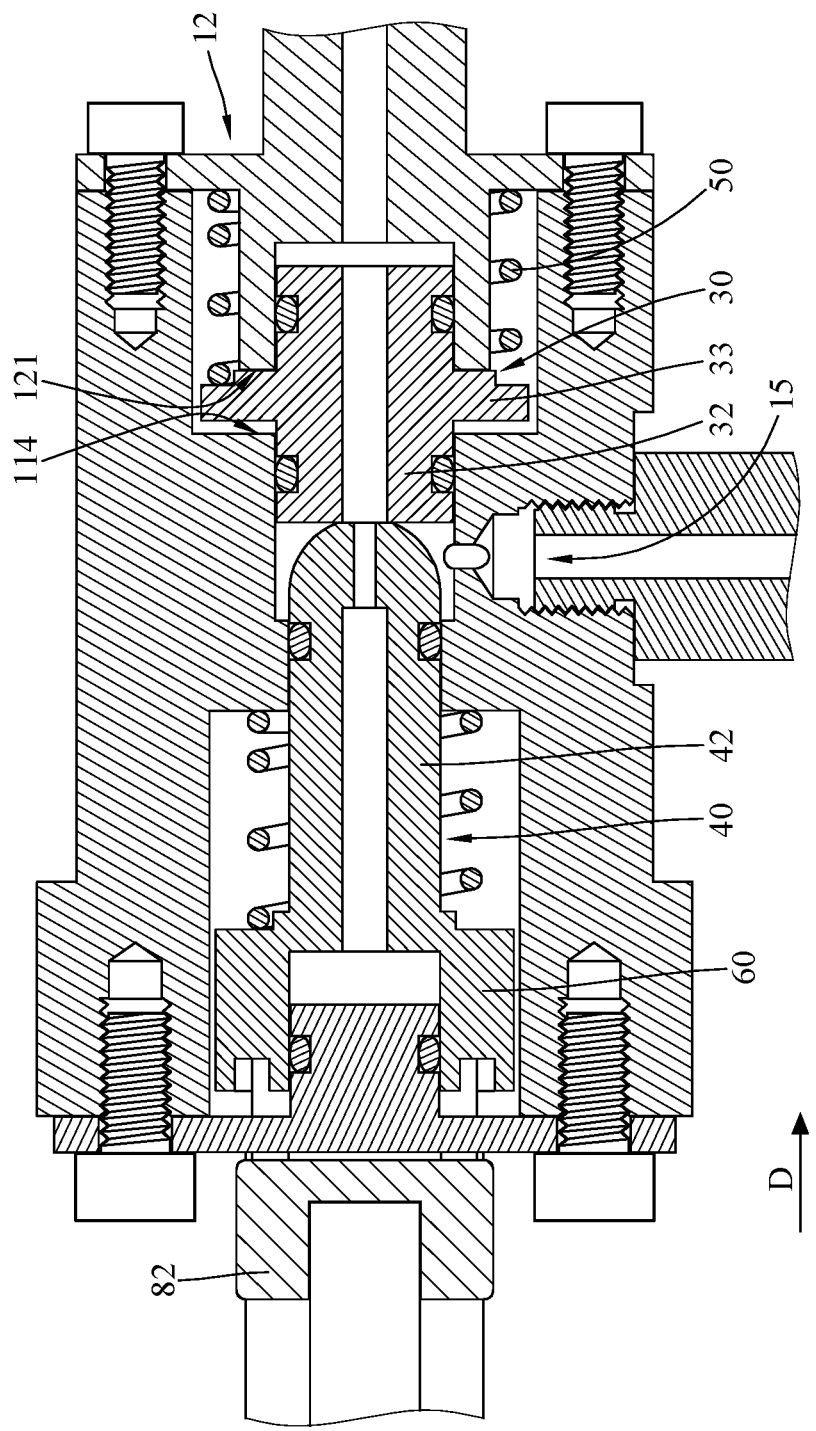
FIG. 6 is a partially enlarged view of the anti-lock brake device in FIG. 2 when the second piston is in a depressurized position.
Figure 7:
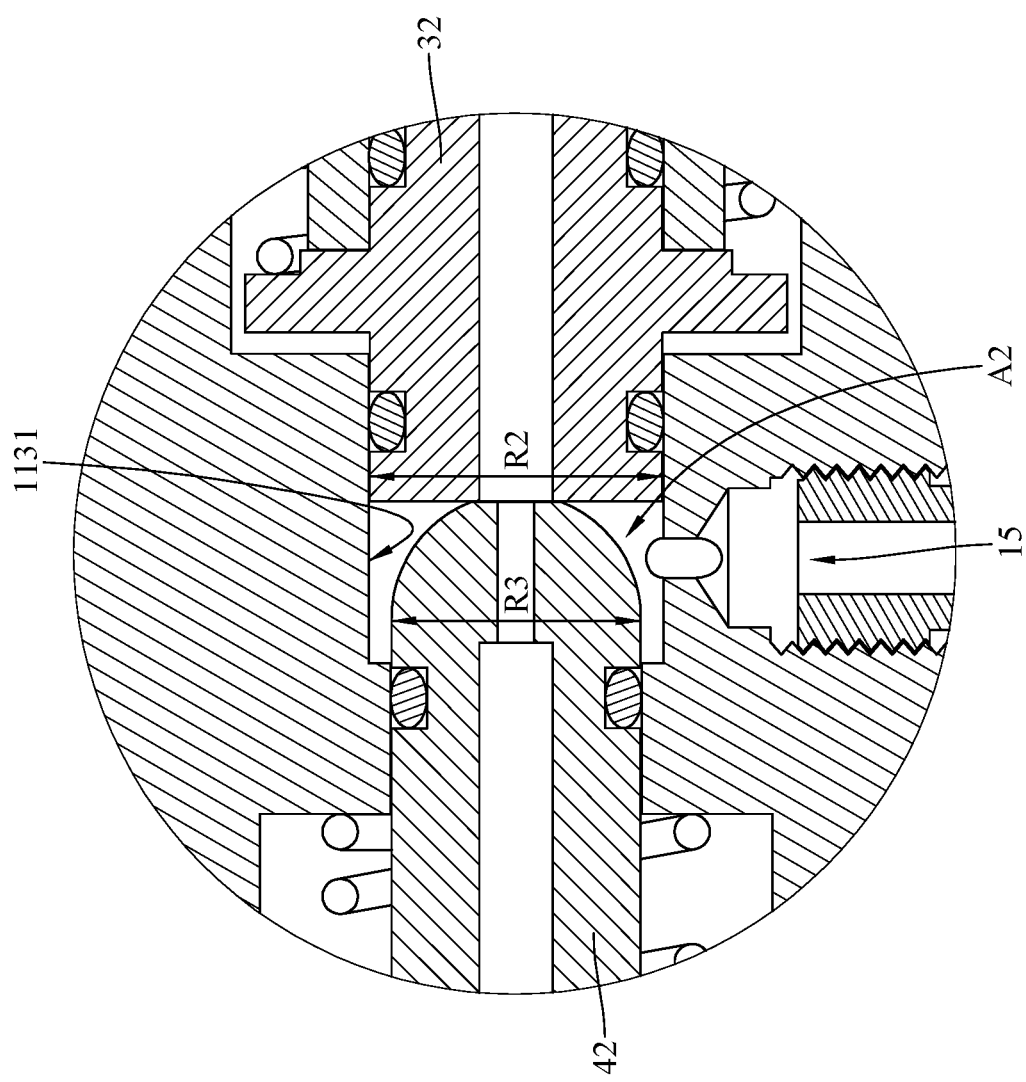
FIG. 7 is a partially enlarged view of the anti-lock brake device in FIG. 6.

Please refer to FIGS. 4 to 7. FIG. 4 is a partially enlarged view of the anti-lock brake device in FIG. 1 when the second piston is in a closed position. FIG. 5 is a partially enlarged view of the anti-lock brake device in FIG. 4. FIG. 6 is a partially enlarged view of the anti-lock brake device in FIG. 1 when the second piston is in a depressurized position. FIG. 7 is a partially enlarged view of the anti-lock brake device in FIG. 6.

As shown in FIGS. 4 and 5, when the second piston 40 is in the closed position, the movable component 60 presses the second elastic component 70, and the push portion 42 of the second piston 40 is in contact with the contact portion 32 of the first piston 30, such that the second oil channel 41 is directly connected to the first oil channel 31 so as to disconnect the first oil channel 31 from the oil outlet 15. At this moment, the part of the wide portion 1131 that is not occupied by the push portion 42 of the second piston 40 and the contact portion 32 of the first piston 30 forms a chamber which has a first unoccupied volume A1, and the first unoccupied volume A1 is equal to the volume of the wide portion 1131 minus the volumes of the parts that the contact portion 32 and the push portion 42 are located in the wide portion 1131.

Then, as shown in FIGS. 6 and 7, the push component 82 keeps pushing the movable component 60 along the direction D so as to move the second piston 40 to the depressurized position from the closed position. When the second piston 40 reaches the depressurized position, the flange portion 33 of the first piston 30 presses the first elastic component 50 and is in contact with the second stop surface 121 of the first cover 12.

In this embodiment, the second stop surface 121 and the first stop surface 114 can limit the movement of the first piston 30 so as to ensure that the first piston 30 is only movable between the second stop surface 121 and the first stop surface 114.

When the second piston 40 is moved to the depressurized position from the closed position, the push portion 42 of the second piston 40 presses against and is moved with the contact portion 32 of the first piston 30, such that the first unoccupied volume A1 of the chamber is increased to a second unoccupied volume A2 due to the different outer diameters of the push portion 42 and the contact portion 32. In detail, the outer diameter R2 of the contact portion 32 is larger than the outer diameter R3 of the push portion 42, such that after the contact portion 32 and the push portion 42 have been moved together by a distance, a space, in the wide portion 1131, produced by movement of the contact portion 32 is larger than another space, in the wide portion 1131, occupied by the push portion 42. As such, when the second piston 40 is moved to the depressurized position from the closed position, the chamber formed by the part of the wide portion 1131 which is not occupied by the push portion 42 of the second piston 40 and the contact portion 32 of the first piston 30 is increased to the second unoccupied volume A2 form the first unoccupied volume A1. Therefore, it is understood that, when the second piston 40 is moved from the closed position to the depressurized position, the different outer diameters of the first piston 30 and the second piston 40 can increase the room for accommodating the oil so as to decrease the oil pressure in the oil outlet 15, thereby allowing the caliper to slightly loosen the bicycle brake disk to prevent the wheel from being locked up and thus avoiding the bicycle from skidding. Therefore, the anti-lock brake device 1 of the disclosure is able to prevent the bicycle from losing control while squeezing the brake lever 20 too hard.

In addition, the first piston 30 and the second piston 40 both are in the static equilibrium state when the second piston 40 is in the initial position, such that the push component 82 is only required to overcome the difference between the forces resulted from the oil exerting on the opposite ends of the contact portion 32 and the push portion 42 that have different outer diameters R1 and R4 when the second piston 40 is moved from the initial position to the depressurized position. Therefore, the driving device 80 can be lightweight and still able to push the second piston 40 to the depressurized position, achieving a lightweight bicycle.

When the detecting device detects that the wheel begins to rotate, the controller will stop the push component 82 of the driving device 80 from pushing the movable component 60. At this moment, the first elastic component 50 and the second elastic component 70 will be released, and the first elastic component 50, the second elastic component 70 and the difference between the forces resulted from the oil exerting on the opposite ends of the contact portion 32 and the push portion 42 can force the flange portion 33 of the first piston 30 to contact the first stop surface 114 and force the movable component 60 to contact the second cover 13. As such, the first oil channel 31 of the first piston 30 is connected to the oil outlet 15 again so that the oil can be transmitted to the oil outlet 15 from the oil inlet 14 so as to cause the caliper to clamp the bicycle brake disk. Once the detecting device detects that the wheel is locked again, then the aforementioned steps will be repeated until the braking stops.

Figure 8:
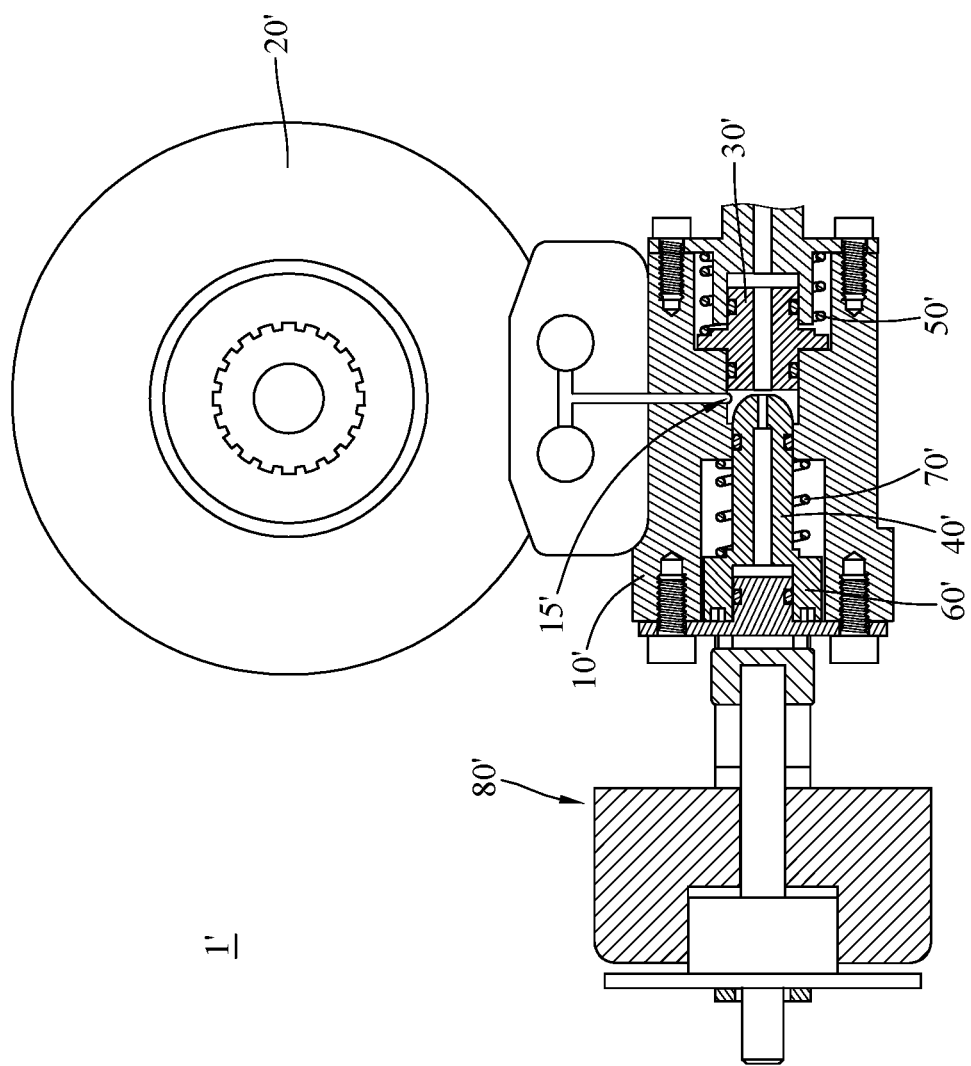
FIG. 8 is a partial cross-sectional view of an anti-lock brake device according to a second embodiment of the disclosure.

In the disclosure, the connection between the brake lever 20 and the oil pressure tank 10 is not restricted. For example, please refer to FIG. 8, and FIG. 8 is a partial cross-sectional view of an anti-lock brake device according to a second embodiment of the disclosure.

This embodiment provides an anti-lock brake device 1'. The anti-lock brake device 1' includes an oil pressure tank 10', a caliper 20', a first piston 30', a second piston 40', a first elastic component 50', a movable component 60', a second elastic component 70' and a driving device 80'. In this embodiment, the caliper 20' is directly connected to an oil outlet 15' of the oil pressure tank 10', and the other components that are similar to that of the previous embodiment will not be repeatedly explained hereinafter.

According to the anti-lock brake devices as discussed above, due to the cooperation of the different outer diameters of the first piston and the second piston and the wide portion of connect chamber, the room in the wide portion for accommodating oil is increased so as to decrease the oil pressure at the oil outlet when the second piston is moved from the closed position to the depressurization position. This can slightly release the caliper from the bicycle brake disk to make the wheel rotatable at the moment, thereby avoiding the wheel from being locked and thus preventing skidding.

In addition, the first oil channel and the second oil channel respectively penetrate through the contact portion of the first piston and the push portion of the second piston, and both the contact portion and the push portion have the same diameter on either side, such that the first piston and the second piston both are in the static equilibrium state when the second piston is in the initial position.

Moreover, since the first piston and the second piston both are in the static equilibrium state when the second piston is in the initial position, the push component is only required to overcome the difference between the forces resulted from the oil exerting on the opposite ends of the contact portion and the push portion that have different outer diameters when the second piston is moved from the initial position to the depressurized position. Therefore, the driving device can be lightweight and still able to push the second piston to the depressurized position, achieving a lightweight bicycle.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:
1. An anti-lock brake device, comprising:
an oil pressure tank, having an internal space, an oil inlet and an oil outlet that are connected to one another;

a first piston, slidably located in the internal space, wherein the first piston has a first oil channel, the first piston comprises a contact portion, and the first oil channel penetrates through the contact portion and is connected to the oil inlet; and a second piston, slidably located in the internal space and movable among an initial position, a closed position and a depressurized position, wherein the closed position is located between the initial position and the depressurized position, the second piston comprises a push portion, and an outer diameter of the push portion is smaller than an outer diameter of the contact portion;

wherein when the second piston is in the initial position, the push portion and the contact portion are separated from each other, and the first oil channel is connected to the oil inlet via the internal space; when the second piston is in the closed position, the push portion is in contact with the contact portion and disconnects the first oil channel from the oil outlet so as to form a chamber having a first unoccupied volume in the internal space; when the second piston is moved from the closed position to the depressurized position, the push portion presses against and moves the contact portion, such that the first unoccupied volume of the chamber is increased to a second unoccupied volume due to the different outer diameters of the push portion and the contact portion.

2. The anti-lock brake device according to claim 1, wherein the second piston has a second oil channel, the second oil channel penetrates through the push portion; when the second piston is in the initial position, the second oil channel is connected to the internal space; when the second piston is in the closed position, the second oil channel is connected to the first oil channel and is disconnected from the internal space.

3. The anti-lock brake device according to claim 1, further comprising a first elastic component and a second elastic component, wherein the first elastic component is disposed on the first piston, the first elastic component is configured to force the first piston to move toward the second piston, the second elastic component is disposed on the second piston, and the second elastic component is configured to force the second piston to move away from the first piston.

4. The anti-lock brake device according to claim 3, wherein the internal space has a first chamber, a second chamber and a connect chamber, the connect chamber comprises a wide portion and a narrow portion connected to each other, the wide portion is wider than the narrow portion, the first chamber is connected to an end of the wide portion away from the narrow portion, the second chamber is connected to an end of the narrow portion away from the wide portion, the oil outlet is connected to the wide portion, the oil inlet is connected to the first chamber, the contact portion of the first piston is partially located in the first chamber, another part of the contact portion is located in the wide portion, the push portion of the second piston extends from the wide portion to the second chamber, the first elastic component is located in the first chamber, and the second elastic component is located in the second chamber.

5. The anti-lock brake device according to claim 4, wherein the oil pressure tank has a first stop surface, the first chamber is wider than the wide portion, the first stop surface is located between the first chamber and the wide portion, the oil pressure tank further has a first cover, the first cover covers a side of the first chamber away from the connect chamber, the oil inlet penetrates the first cover, the first piston further comprises a flange portion, the flange portion protrudes from the contact portion in a radial direction of the contact portion, two opposite ends of the first elastic component respectively press against the flange portion and the first cover; when the second piston is in the initial position, the first elastic component forces the first piston to be in contact with the first stop surface.

6. The anti-lock brake device according to claim 5, wherein the first cover has a second stop surface; when the second piston is in the depressurized position, the flange portion is in contact with the second stop surface of the first cover.

7. The anti-lock brake device according to claim 5, further comprising a movable component, wherein the oil pressure tank has an inner surface, the second chamber is wider than the narrow portion, the inner surface is located between the second chamber and the narrow portion, the oil pressure tank further has a second cover, the second cover covers a side of the second chamber away from the connect chamber, the oil outlet is located between the first cover and the second cover, the movable component is connected to the push portion of the second piston, two opposite ends of the second elastic component respectively press against the inner surface and the movable component; when the second piston is in the initial position, the movable component is in contact with the second cover.

8. The anti-lock brake device according to claim 1, wherein two opposite ends of the contact portion of the first piston have the same outer diameter.

9. The anti-lock brake device according to claim 1, wherein two opposite ends of the push portion of the second piston have the same outer diameter.

10. The anti-lock brake device according to claim 1, further comprising a driving device configured to move the second piston.

11. The anti-lock brake device according to claim 1, further comprising a brake lever directly connected to the oil inlet of the oil pressure tank.

12. The anti-lock brake device according to claim 1, further comprising a caliper directly connected to the oil outlet of the oil pressure tank.

* * * * *